United States Patent
Bungter

[11] Patent Number: 5,816,381
[45] Date of Patent: Oct. 6, 1998

[54] TRANSPORT APPARATUS FOR TEXTILE PACKAGES, TRANSPORT SYSTEM AND AUTOMATIC CAN TRANSPORT VEHICLE HAVING THE TRANSPORT APPARATUS

[75] Inventor: Helmut Bungter, Viersen, Germany

[73] Assignee: W. Schlafhorst AG & Co., Monchen-Gladbach, Germany

[21] Appl. No.: 513,324

[22] Filed: Aug. 10, 1995

[30] Foreign Application Priority Data

Aug. 10, 1994 [DE] Germany .......................... 44 28 247.8

[51] Int. Cl.⁶ .................................................. B65G 25/02
[52] U.S. Cl. .......................... 198/301; 198/740; 198/744; 198/746
[58] Field of Search ................................... 198/740, 744, 198/746, 748, 301, 304

[56] References Cited

U.S. PATENT DOCUMENTS

| | | | |
|---|---|---|---|
| 3,184,044 | 5/1965 | Allen et al. .............................. | 198/746 |
| 4,537,018 | 8/1927 | Tooka . | |
| 4,749,079 | 6/1988 | Minto .................................. | 198/746 X |
| 4,850,470 | 7/1989 | Ferkany .............................. | 198/740 X |
| 5,320,213 | 6/1994 | McIntosh et al. ....................... | 198/744 |

FOREIGN PATENT DOCUMENTS

| | | |
|---|---|---|
| 0 423 519 | 4/1991 | European Pat. Off. . |
| 0 082 926 | 7/1983 | Germany . |
| 0 149 980 | 7/1985 | Germany . |
| 31 18 133 | 9/1985 | Germany . |
| 29 15 095 | 4/1987 | Germany . |
| 36 26 494 | 2/1988 | Germany . |
| 37 31 497 | 4/1988 | Germany . |
| 40 25 647 | 4/1991 | Germany . |
| 40 31 511 | 4/1992 | Germany . |
| 92 10 330.8 | 1/1993 | Germany . |
| 43 05 916 | 9/1994 | Germany . |
| 674 513 | 6/1990 | Switzerland . |

*Primary Examiner*—D. Glenn Dayoan
*Attorney, Agent, or Firm*—Herbert L. Lerner; Laurence A. Greenberg

[57] ABSTRACT

A transport apparatus for feeding textile packages used in the textile industry in two transport directions includes a first pusher element being displaceable in two transport directions and a second pusher or indexing element extending parallel to the first pusher element. A coupling device couples the elements in various positions with limited mutual movement. A reversible drive mechanism is connected to one of the elements for acting on the one element to produce a relative motion between the elements. Latch carriers for the two transport directions are movably supported on the first pusher element. The latch carriers are pivotal into a transport plane of sliver holding containers in accordance with the transport directions by the second pusher or indexing element. The latch carriers are automatically pivoted into a transport position or an idle stroke position under influence of the relative motion. A transport system may also include a plurality of the transport apparatuses and an automatic can transport vehicle may include at least one transport apparatus.

18 Claims, 6 Drawing Sheets

TRANSPORT APPARATUS FOR TEXTILE PACKAGES, TRANSPORT SYSTEM AND AUTOMATIC CAN TRANSPORT VEHICLE HAVING THE TRANSPORT APPARATUS

BACKGROUND OF THE INVENTION

1. Field of the Invention

The invention relates to a transport apparatus for textile packages used in the textile industry, with a pusher element being displaceable in a transport direction, on which movably supported latch carriers are secured.

One such transport apparatus is described in German Utility Model G 92 10 330, for instance. That known device includes a transport ring extending around a spinning mill machine, for displacing spinning cans. The transport ring has a feed or feed-in position for full spinning cans, and a discharge or feed-out position for empty spinning cans. The spinning can transport is accomplished through the use of a longitudinally movably guided rod, on which movable latch carriers are secured. The latch carriers movably disposed on the push rod are each supported, through a pin extending crosswise to the longitudinal direction of the rod, in such a way that upon a motion in the forward pushing direction, they engage the lower edge of the can from the rear, and upon a motion in the opposite direction they slide beneath the can.

Similar can transport devices are also known from European Patent Application 0 423 519 A2 and German Published, Non-Prosecuted Application DE 40 31 511 A1.

The apparatus described in European Patent Application 0 423 519 A2 has a transport path for a sliding, onward transport of spinning cans. A straight push rod that is supported on the bottom between two slide rails associated with the cans serves as a can transporter. Carriers disposed radially with respect to the longitudinal axis of the rod extend away from the push rod. A forward-push rod is supported so as to be swivelable back and forth by approximately 90° about its longitudinal axis, in order to align the carriers and pivot them out of the way, and is also supported so as to be displaceable back and forth in the direction of its longitudinal axis.

A slide rail or half-bearing of plastic is used as the bearing. The rod, like the carriers, is formed of steel pipe. The length of the carriers is chosen in such a way that carriers standing upright engage the cans on the inside edge of the bottom and carry them along in the transport direction. In the return stroke of the intermittently moved pushrod, the carriers are swiveled into a horizontal position and thus can be shifted rearward beneath the cans.

The transport apparatus of German Published, Non-Prosecuted Application DE 40 31 511 A1 uses an adjustable-height pushrod. In order to displace the spinning cans, the pushrod equipped with carriers is raised intermittently, so that the carriers can engage the inner edge of the can from below. In the return stroke, the push rod is correspondingly lowered, so that the carriers are then disengaged from the spinning cans.

SUMMARY OF THE INVENTION

It is accordingly an object of the invention to provide a transport apparatus for textile packages, which further improves and overcomes the hereinafore-mentioned disadvantages of the heretofore-known transport systems of this general type.

With the foregoing and other objects in view there is provided, in accordance with the invention, a transport apparatus for feeding textile packages used in the textile industry in two transport directions, comprising a first pusher element being displaceable in two transport directions; a second pusher or indexing element extending parallel to the first pusher element; a coupling device for coupling the elements in various positions with limited mutual movement; a reversible drive mechanism being connected to one of the elements for acting on the one element to produce a relative motion between the elements; and latch carriers for the two transport directions being movably supported on the first pusher element, the latch carriers being pivotal into a transport plane of sliver holding containers in accordance with the transport directions by the second pusher or indexing element, and the latch carriers being automatically pivoted into one of a transport position and an idle stroke position under influence of the relative motion.

The transport apparatus according to the invention is a very low-height, universally usable transport apparatus that enables problem-free transporting of textile packages in two directions. Its advantage is above all that the latch carriers, which are preferably movably supported on one common push element, can be used in both directions of transport. As a result, during the transport mode, the latch carriers are automatically pivoted into the transport plane of the textile packages and automatically lowered in the reverse stroke of the intermittent-operation transport apparatus, as a function of the transport direction which is established.

In accordance with another feature of the invention, a pusher element equipped with the latch carriers and a parallel pusher/indexing element, which is functionally connected to the latch carriers, are connected to one another through a coupling device. The coupling device is constructed in such a way that the pusher element and the pusher or indexing element can be coupled to one another in two different positions.

The coupling position of the two pusher elements at a given time defines the direction of a relative motion that occurs between the elements at the beginning of transport. Since this relative motion between the pusher element and the pusher or indexing element assures the automatic inward and outward pivoting of the latch carriers, the transport direction of the apparatus according to the invention can be established in a simple way. Through a special construction of the indexing mechanism or the articulation of the latch carriers, it is moreover assured that there will be no contact points in which human operators could get caught while the latch carriers are pivoting inward or outward.

The advantageous compact construction of the apparatus opens up manifold possible uses. For instance, the apparatus can be constructed as a stationary can transport apparatus. In that case, it is either installed in suitable mounting channels in the factory floor, or mounted directly on the existing floor of a spinning mill building, which is also possible because of its low construction. The transport apparatuses have the advantage that with suitable dimensioning, they can also be drivable by auxiliary vehicles, such as forklifts.

In accordance with a further feature of the invention, the transport apparatus is built into a mobile server unit, such as a driverless can transport vehicle.

In accordance with an added feature of the invention, one of the two pusher elements can be acted upon directly, for instance through a reversible drive engaging one coupling half, while the other pusher element is carried along through indexable blocking devices in the coupling device.

In accordance with an additional feature of the invention, the blocking devices, which can be triggered in defined fashion and are displaceably supported in one of the coupling halves, can be positioned, in accordance with the desired transport direction, in associated oblong-slot-like receptacles in the other coupling half.

Securing and functionally connecting the latch carriers to the pusher elements is simple and effective. No particular drive mechanism is needed for adjusting or deploying the latch carriers.

In accordance with yet another feature of the invention, the latch carriers, which protrude past the transport plane and engage the edge of the spinning can from behind and below in the outward-swiveled state, are each supported movably through a pivot pin on one of the pusher elements. Below the pivot pin, the rocker-like latch carriers each have a guide, in which a stop secured to the other pusher or thrust element is mounted. The shifting of this stop at the beginning of the transport increment, or in other words the relative motion between the pusher or thrust elements that occurs from the system friction, results in the latch carriers being immediately positioned automatically in the transport direction.

In accordance with yet a further feature of the invention, the guide in each latch carrier is constructed as a slit being open at the bottom. The associated stop is a bolt-like structural part that is secured to the other pusher element.

The extremely simple construction of the transport apparatus according to the invention enables such an apparatus to be manufactured "by the yard", as it were. The number of latch carriers needed at a given time depends on the number of spinning cans to be displaced simultaneously and on the length of the particular working stroke, and it can be optimized by suitably defining the stroke length of the working increment of the drive mechanism.

In accordance with yet an added feature of the invention, a plurality of transport apparatuses are coupled by a connecting device to make an extra-long transport apparatus, which, for instance, has a favorable effect on the number of reversible drive mechanisms that are needed.

In accordance with yet an additional feature of the invention, the pusher elements are longitudinally displaceably supported in guide elements being spaced apart from one another. Depending on the configuration of the transport apparatus, these guide elements are either secured directly to the factory floor or are secured to the bottom of mounting conduits that are embedded into the factory floor. The guide elements, which fit partly over or through the pusher elements, are readily accessible, so that the overall result is an embodiment of the transport apparatus that is easy to mount and to maintain and repair.

In accordance with again another feature of the invention, a plurality of transport apparatuses according to the invention are combined into one can transport system.

In accordance with again a further feature of the invention, at least one of the reversible drives of these transport apparatuses is constructed in such a way that an "excess stroke" can be employed as needed. Through the use of such an excess stroke, it becomes possible to shift the front latch carriers of a transport apparatus into the region of the adjacent transport apparatus and there to engage a spinning can positioned in that region. Such an embodiment thus makes additional transfer devices, such as pushers, baffles, and so forth, unnecessary.

In accordance with again an added feature of the invention, there are provided sensor devices disposed in a transfer or transition region between transport apparatuses, for monitoring the particular load status of the transport apparatus and being connected to a central control unit. The control unit also monitors the reversible drives of the transport apparatuses. Devices equipped in this way permit an automatic can transfer between adjacent transport apparatuses.

In accordance with a concomitant feature of the invention, the transport apparatus of the invention is integrated into a preferably driverless can transport vehicle. The can transport vehicle has a plurality of can parking places disposed side by side, and one of the can transport apparatuses according to the invention is disposed in a bottom region of each parking place. The can transport apparatuses, operating in both directions, make problem-free loading and unloading of the can transport vehicle possible in a simple way. Loading or unloading can be done from either side of the vehicle.

Other features which are considered as characteristic for the invention are set forth in the appended claims.

Although the invention is illustrated and described herein as embodied in a transport apparatus for textile packages, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
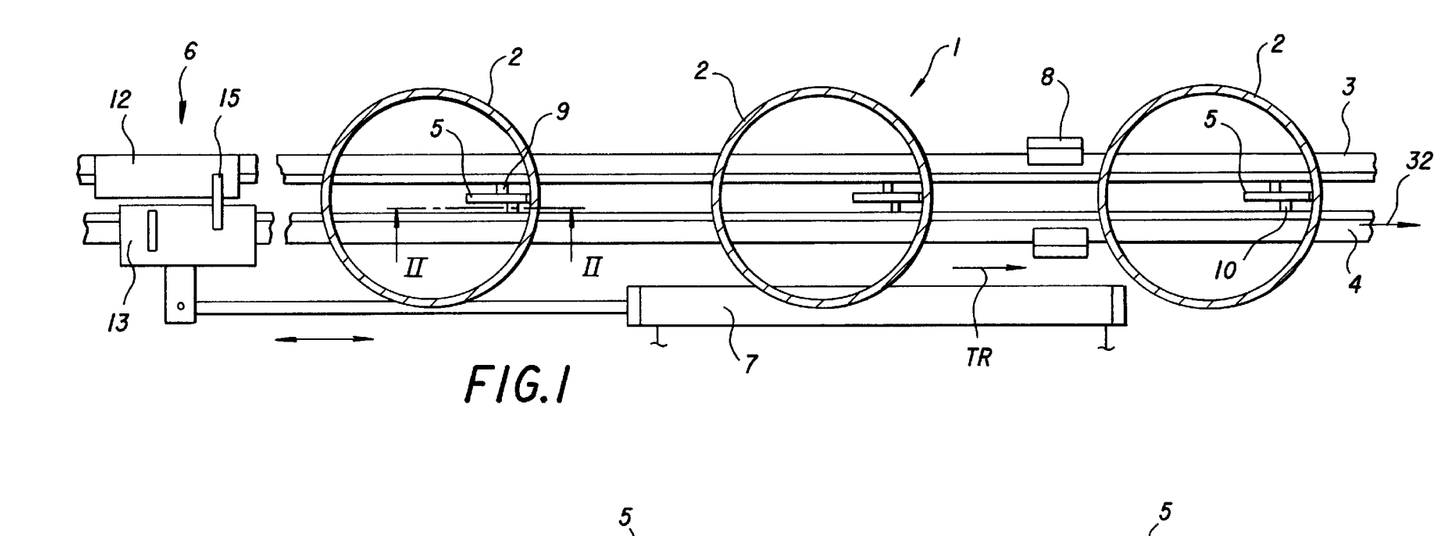
FIG. 1 is a fragmentary, diagrammatic, plan view of a transport apparatus according to the invention.
Figure 2:
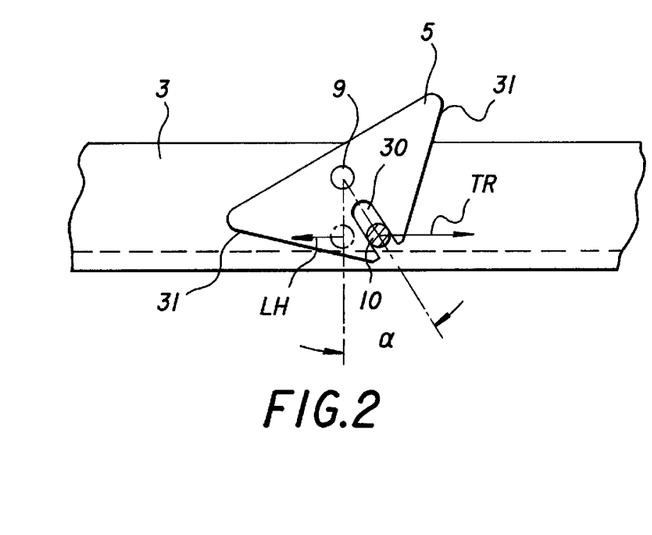
FIG. 2 is an enlarged, fragmentary, sectional view of a pivotably supported latch carrier, which is taken along a line II—II of FIG. 1, in the direction of the arrows.

Referring now to the figures of the drawing in detail and first, particularly, to FIG. 1 thereof, there is seen a plan view of a spinning can transport apparatus, which is identified overall by reference numeral 1. The spinning can transport apparatus 1 has two longitudinal pusher elements 3 and 4, which are joined together through a coupling device 6. The pusher elements 3, 4 are displaceably supported in guide devices 8. Disposed between the first and second pusher elements 3 and 4 are latch carriers 5 which, as is shown particularly in FIG. 2, are at least limitedly movably supported by a pivot pin 9. The approximately rocker-like latch carriers 5 have a slit-like guide 30 below the pivot pin 9. A stop 10 is guided in sliding fashion in the guide 30. The latch carriers 5 are rotatably secured through the pivot pin 9 to one of the two pusher elements, which is the pusher element 3 in the illustrated exemplary embodiment, and are functionally connected to the other pusher or indexing element 4 through the stop 10. In other words, upon a relative motion of the pusher elements 3 and 4, the latch carriers are rotated about the pivot pin 9, and in the process one of their carrier surfaces 31 is swiveled into a transport plane of spinning cans 2.

Figure 3:
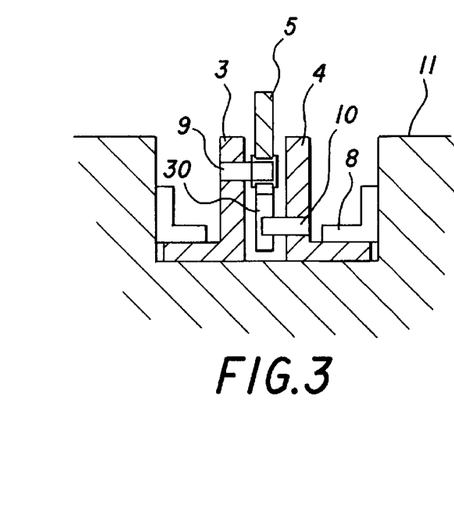
FIG. 3 is an enlarged, fragmentary, sectional view of a can transport apparatus embedded in a factory floor, which is taken along a line III—III of FIG. 5 in the direction of the arrows.

FIG. 3 shows that the spinning can transport apparatus 1 is embedded into a factory floor 11 of a spinning mill building, or is secured directly to the factory floor 11.

Figure 4:
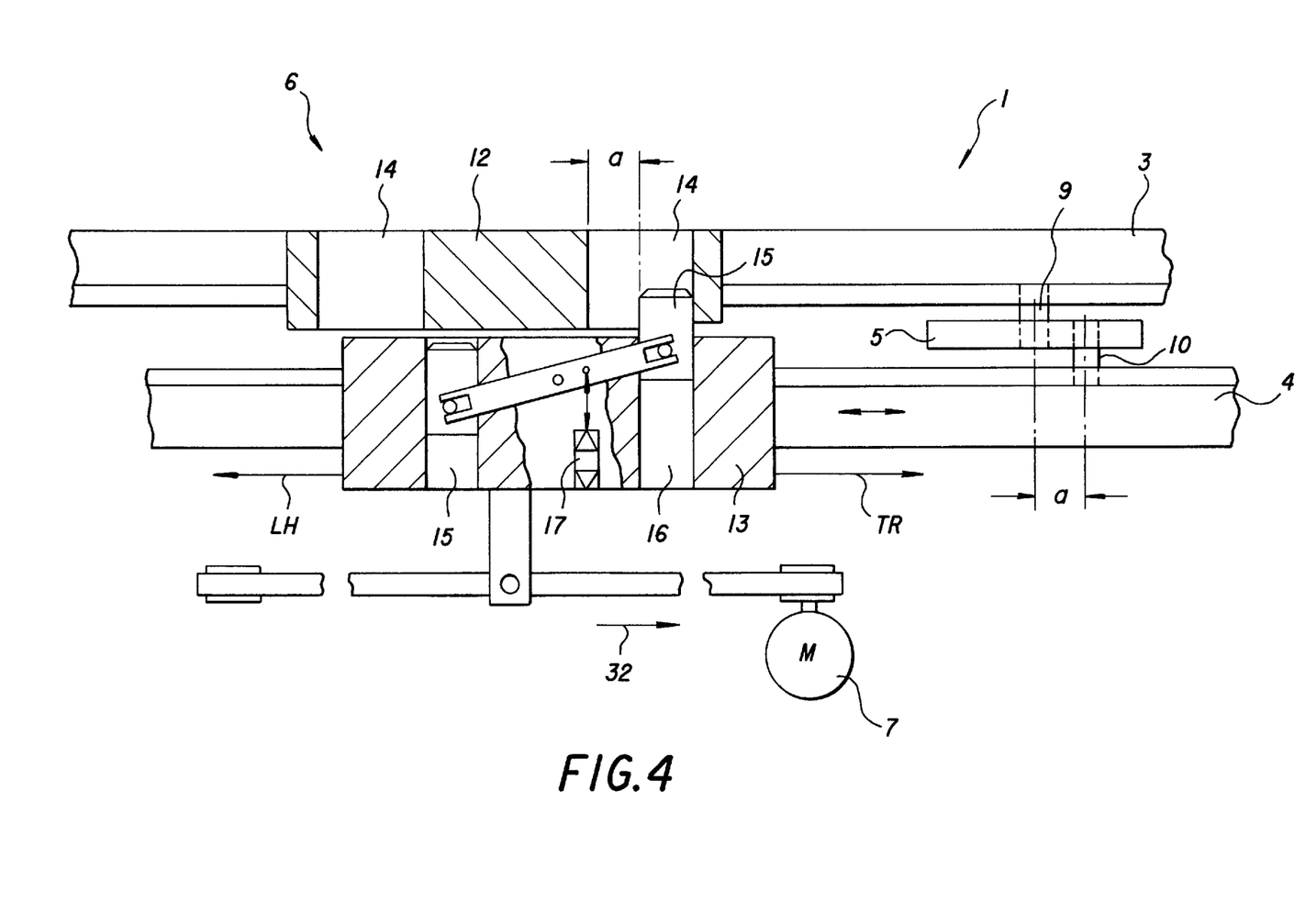
FIG. 4 is a fragmentary, partly sectional and partly broken-away view of an exemplary embodiment of a coupling device.

The pusher elements 3, 4 are connected directly or indirectly to a reversible drive mechanism 7 through the coupling device 6, as is seen in FIG. 4.

As is shown in FIG. 4, the coupling device 6 includes coupling parts 12 and 13. The coupling part 12, which is connected to the pusher element 3, for instance, has at least two oblong-slot-like receptacles 14. At least two blocking devices 15 are supported in slide bores 16 in the coupling part 13. The blocking devices 15 are displaceable in the direction of the coupling part 12 and can be placed in alternation in the receptacles 14. The coupling part 13 is also engaged by a drive train of the reversible drive mechanism 7.

The mode of operation of the apparatus is as follows:

If the blocking device 15 disposed at the right in the coupling part 13 is connected as is shown in FIG. 4, or in other words is positioned in the receptacle 14 of the coupling part 12, by an indexing device 17 that is triggerable in defined fashion, and the reversible drive mechanism 7 acts upon the coupling part 13 in the direction of an arrow 32, the pusher or indexing element 4 first slides in that direction. After it has traversed a distance a, the pusher element 3 is carried along, through the blocking devices 15 of the coupling device 6. The relative motion between the pusher elements 3 and 4 is transmitted through the stop 10 to the latch carriers 5, which are thereby rotated about the pivot pin 9, as a pivot point, by an angle α shown in FIG. 2. The pivot angle α is dependent on the displacement travel a between the pusher elements 3, 4 and on the distance between the stop 10 and the pivot pin 9. The displacement travel a is predetermined in turn by the dimensions of the oblong-slot receptacles 14.

The reversible drive mechanism 7 operates in alternation. In other words, after a forward stroke in a transport direction TR, the drive is switched over to a reverse stroke direction LH. In that drive direction as well, a relative motion between the pusher elements 3 and 4 occurs first, and as a consequence there is an automatic inward pivoting of the latch carriers 5 into an idle stroke position in the direction LH.

Since the direction of the outward pivoting of the latch carriers 5 and therefore the transport direction TR of the can transport apparatus 1 is dependent on the relative motion, and that direction is adjustable at the two blocking devices 15, the transport direction TR of the can transport apparatus according to the invention can be predetermined without problems by triggering the blocking devices 15 in a defined fashion.

As is suggested by FIGS. 3, 5, 6 and FIGS. 7 and 8, the can transport apparatus according to the invention is very universally usable.

Figure 5:
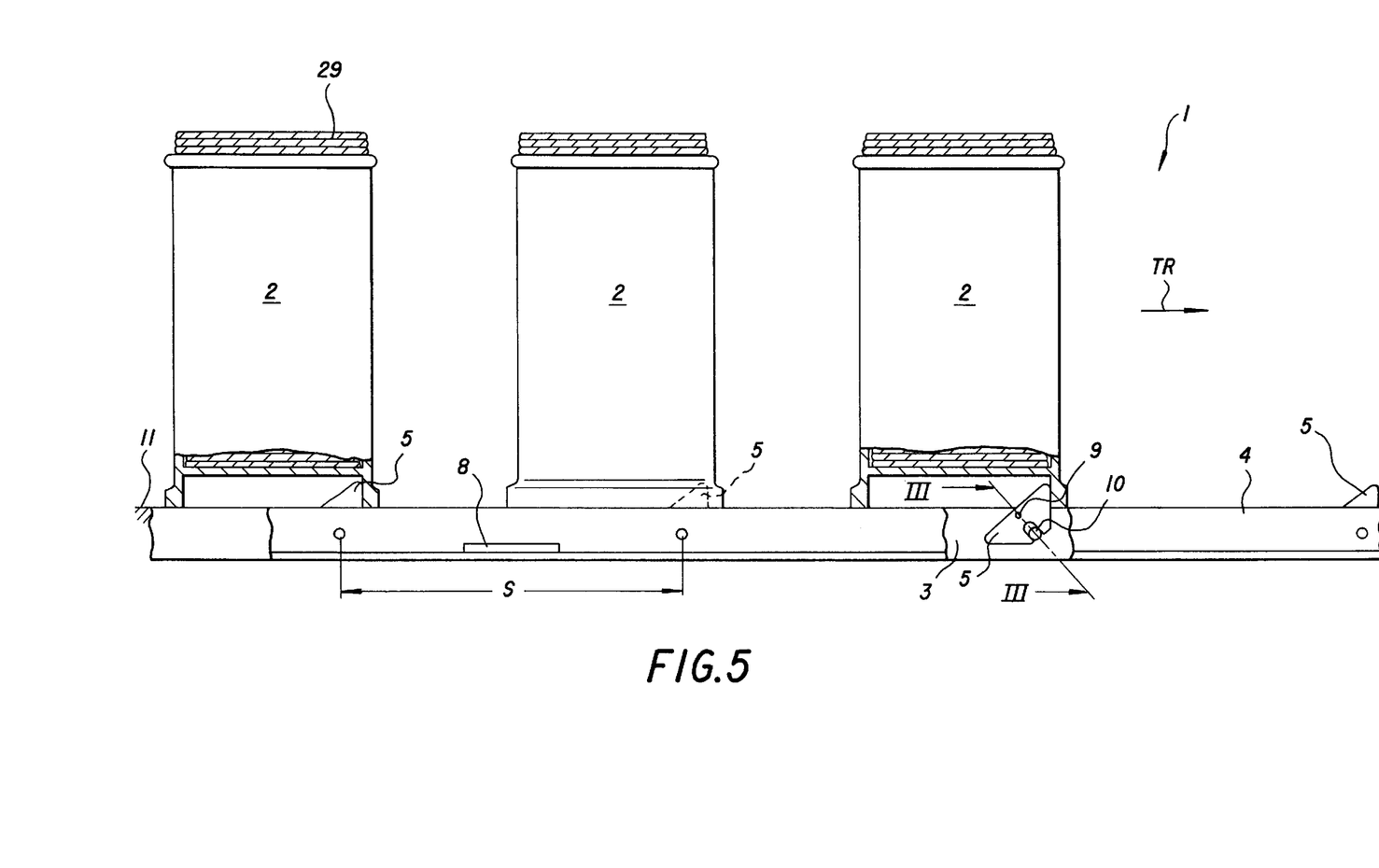
FIG. 5 is a fragmentary, partly broken-away side view of a first embodiment of the can transport apparatus according to the invention.
Figure 6:
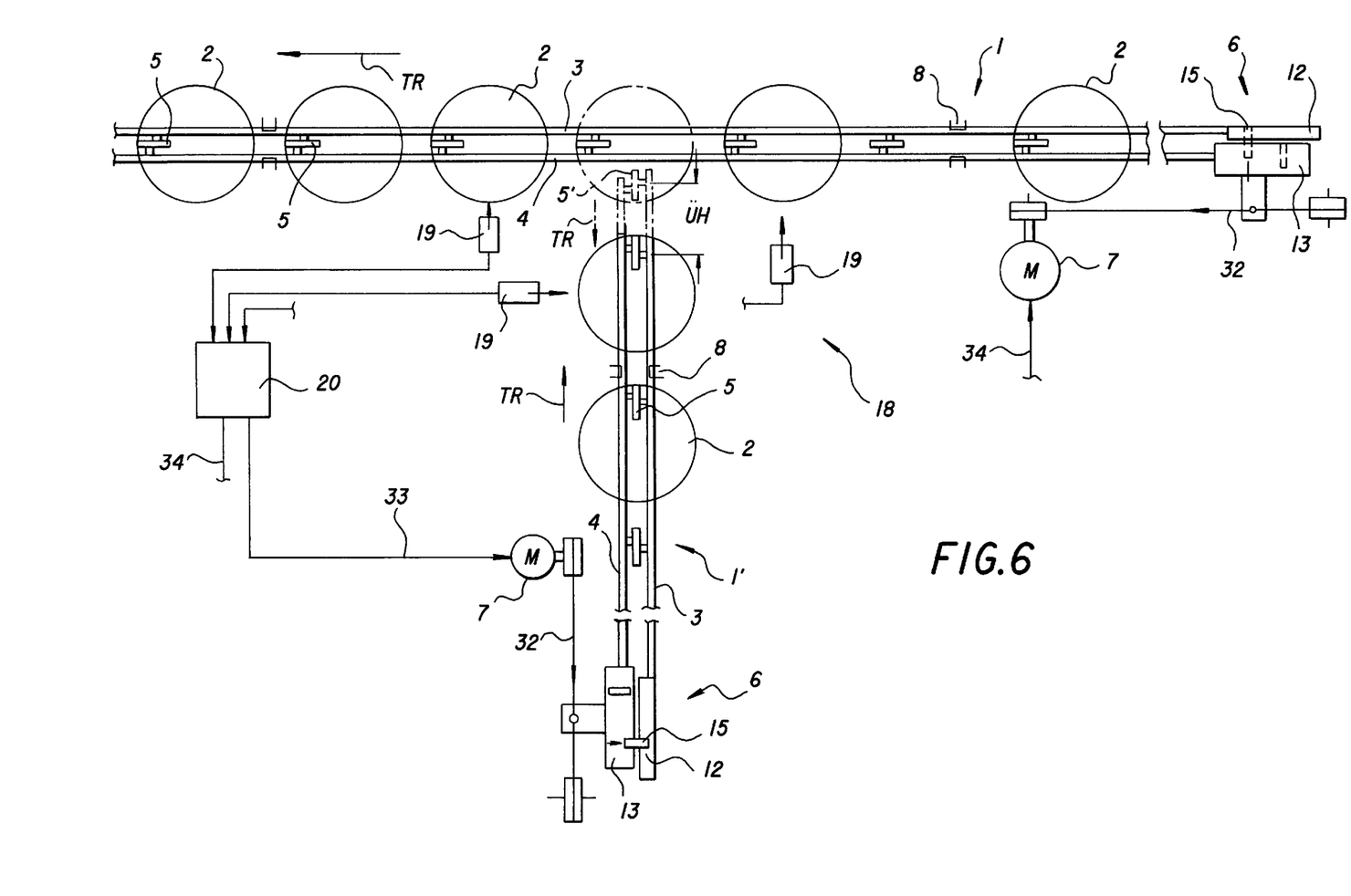
FIG. 6 is a plan view of a plurality of transport apparatuses joined together into a can transport system.

By way of example, FIGS. 3, 5 and 6 on one hand show a stationary transport apparatus in or on the factory floor of a spinning mill building. Such transport apparatuses are manually-accessible when stopped, or without major additional effort they can be made drivable for auxiliary vehicles, such as forklifts.

FIG. 5 shows a side view of a transport apparatus in the course of the displacement of round spinning cans 2. In a folded-out state, the latch carriers protrude beyond the level of the factory floor and engage can bottoms of the spinning cans from below. The spinning cans 2 are displaced in increments in the feed or transport direction TR. The transport stroke of the reversible drive mechanism 7 is equivalent to at least a distance S between the latch carriers 5, plus the amount a of the relative motion.

FIG. 6 shows a plan view of can transport apparatuses 1 and 1', which are combined into a can transport system 18. The drive of the transport apparatus 1', which is disposed orthogonally to the can transport apparatus 1, is constructed in such a way that when needed, an excess stroke UH can be initiated. In this way it is possible for a front latch carrier 5' of the transport apparatus 1' to move underneath a spinning can 2', which is being fed in the transport direction TR in the can transport apparatus 1, and for the spinning can 2' to be drawn into range of the transport apparatus 1', where it is then fed onward in a transport direction TR'. As is suggested in FIG. 6, a transition or transfer region of the transport apparatuses 1, 1' is monitored by sensor devices 19, which in turn are connected to a central control unit 20. The control unit 20 is also connected, through control lines 33, 34, to the reversible drive mechanism 7 and a reversible drive mechanism 7' of the transport apparatuses 1, 1'.

Figure 7:
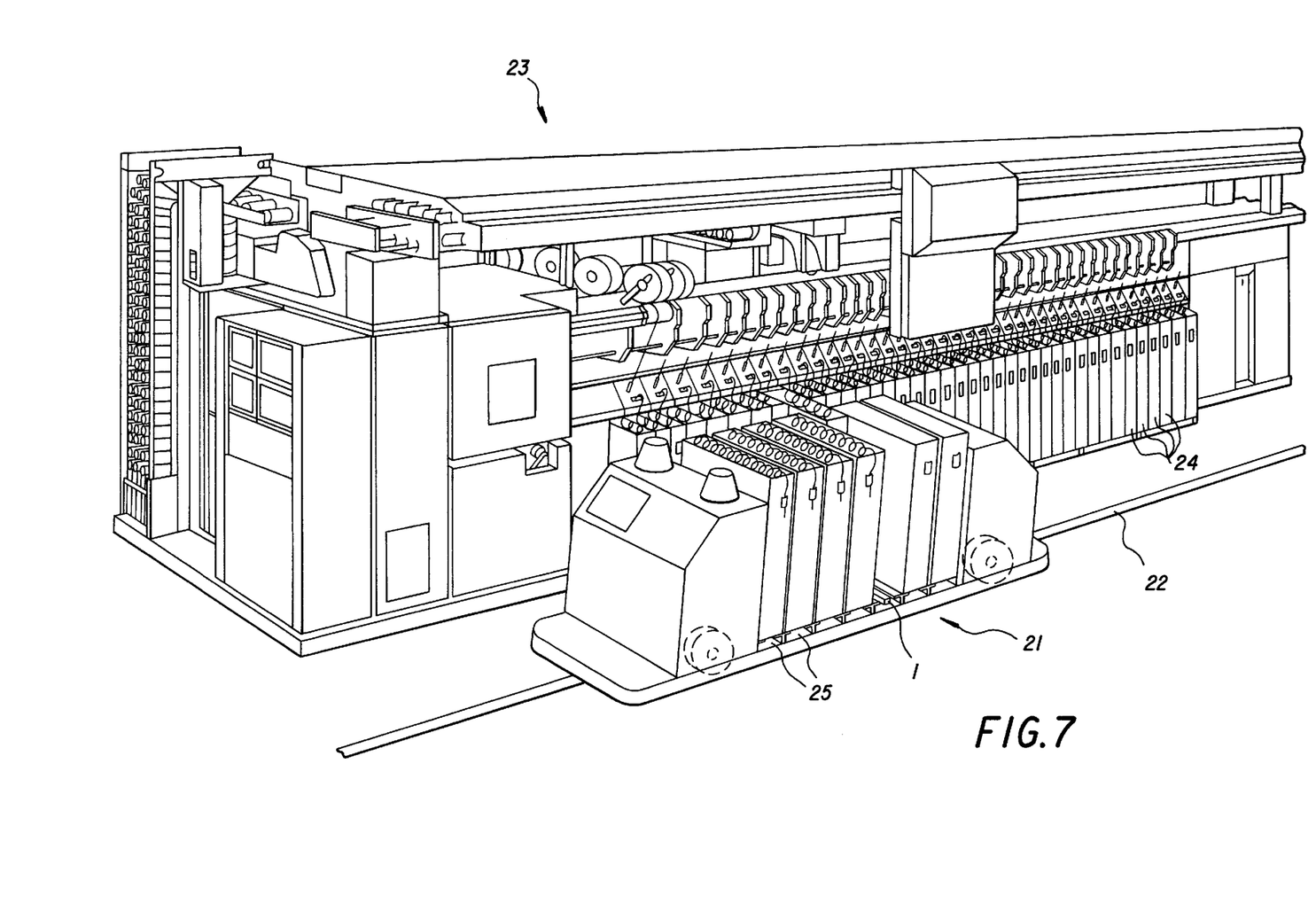
FIG. 7 is a fragmentary, perspective view of a driverless can transport vehicle positioned in front of an open-end spinning machine.
Figure 8:
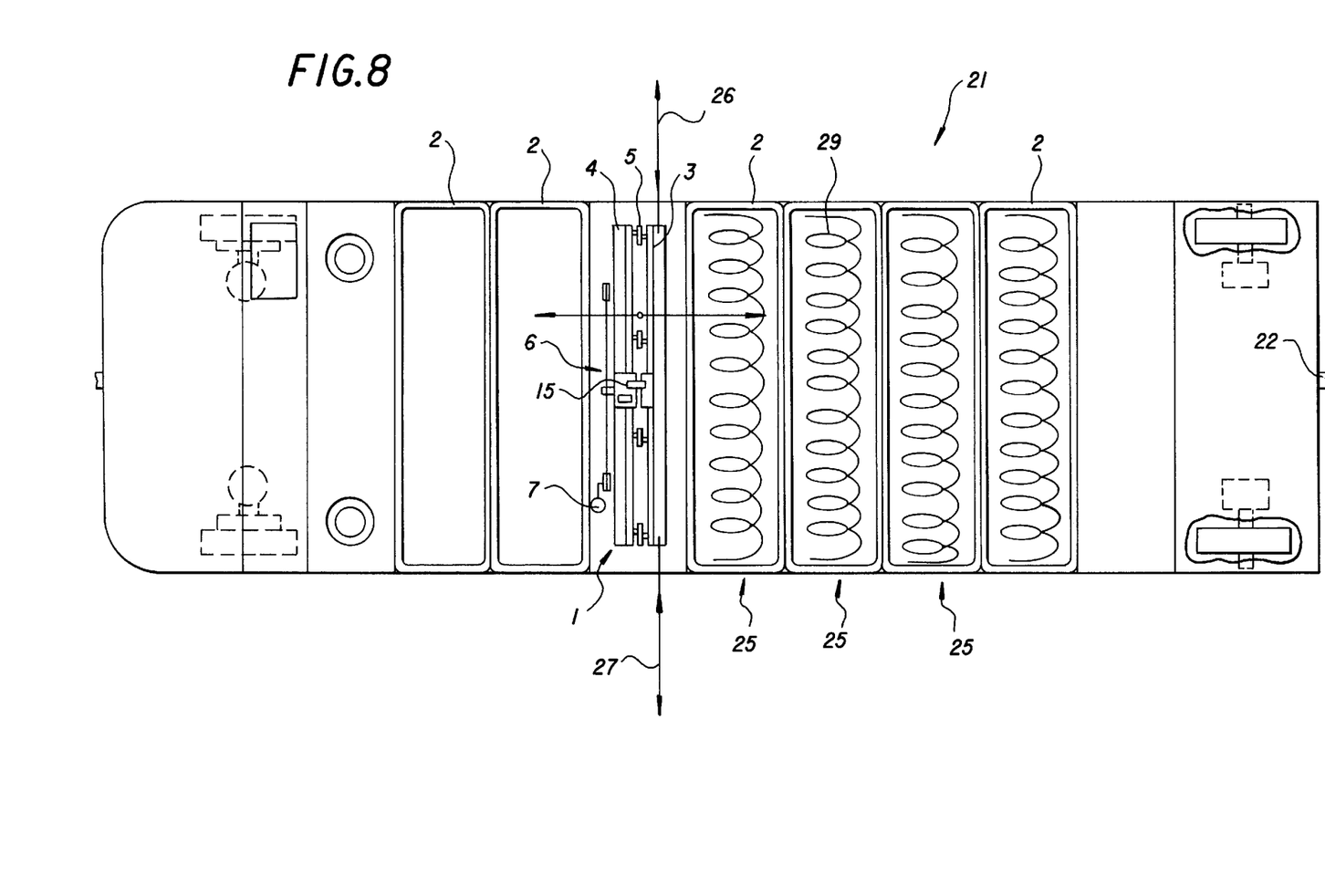
FIG. 8 is a plan view of the can transport vehicle of FIG. 7, with the transport apparatus according to the invention.

FIGS. 7 and 8 show a driverless can transport vehicle 21, which supplies new sliver material 29 to an open-end spinning machine 23 or removes spinning cans that have run empty from the machine.

The spinning cans 2, which are preferably constructed as rectangular cans, are each located in a working position below the associated open-end spinning units, side by side, on special machine parking places 24.

The can transport vehicle 21, which works automatically and by way of example is guided inductively at a guide rail 22, likewise has a number of can parking places 25. A respective one of the can transport apparatuses 1 according to the invention is installed in a bottom region of each of these can parking places 25. Since the can transport apparatuses 1 of the invention can feed in both directions, both pulling and pushing, the vehicle can be loaded on both sides and unloaded from both sides. At a special non-illustrated loading station, spinning cans 2 that are filled with new sliver material 29 are, for instance, pulled onto the vehicle from the left side of the vehicle by the transport apparatus 1, and pushed off again in the region of the spinning machine 23 from the right-hand slide of the vehicle. This loading and unloading of the can transport vehicle 21 is represented in FIG. 8 by double arrows 27 and 26, respectively.

Naturally, it is likewise possible to secure the transport apparatus 1 in the longitudinal axis of the vehicle so as to be displaceable on the transport vehicle 21. A result which is then attained is that only a single transport apparatus 1 according to the invention will be needed for all of the parking places 25 of the transport vehicle 21. In that case, as is suggested by a double arrow 28 in FIG. 8, the transport apparatus 1 approaches the various can parking places 25 in succession and manipulates spinning cans 2 as described above. In other words, the transport apparatus picks up the cans and gives them up.

The transport apparatus according to the invention is not limited to the possible uses described above in connection with can transport apparatuses.

On the contrary, it is entirely conceivable to use the transport apparatus according to the invention in conjunction with ring spinning machines or bobbin winding machines.

In that case, the transport apparatus can be used, for instance, for the defined displacement of single-cop carriers.

I claim:

1. A transport apparatus for feeding textile packages used in the textile industry in two transport directions, comprising:
    a first pusher element being displaceable in two transport directions;
    a second pusher or indexing element extending parallel to said first pusher element;
    a coupling device for coupling said elements in various positions with limited mutual movement;
    a reversible drive mechanism being connected to one of said elements for acting on said one element to produce a relative motion between said elements; and
    latch carriers for the two transport directions being movably supported on said first pusher element, said latch carriers being pivotal into a transport plane of sliver holding containers in accordance with the transport directions by said second pusher or indexing element, and said latch carriers being automatically pivoted into one of a transport position and an idle stroke position under influence of said relative motion.

2. The transport apparatus according to claim 1, wherein said first pusher element and said second pusher or indexing element are longitudinal, parallel, longitudinally displaceable members being at least functionally connected with said latch carriers.

3. The transport apparatus according to claim 1, wherein one of said elements is connected directly to said reversible drive, and the other of said elements is carried along through said coupling device.

4. The transport apparatus according to claim 3, wherein said coupling device has indexing elements for adjusting a transport direction of the transport apparatus.

5. The transport apparatus according to claim 4, wherein said indexing elements are blocking devices, and said coupling device has one coupling part in which said blocking devices are supported and an opposed coupling part having receptacles in which said blocking devices are positionable in a defined manner.

6. The transport apparatus according to claim 5, wherein said blocking devices are bolt-like, triggerable structural parts being displaceably supported in said coupling part.

7. The transport apparatus according to claim 5, wherein said receptacles disposed in said opposed coupling part are recesses shaped in the form of oblong slots.

8. The transport apparatus according to claim 1, wherein said latch carriers are rockers having opposed carrier surfaces, and including pivot pins each movably securing a respective one of said rockers to one of said elements, and stops each functionally connecting a respective one of said rockers to the other of said elements.

9. The transport apparatus according to claim 8, wherein said stops are bolt-like, and said latch carriers each have a fork-like guide slit formed therein below said pivot pin, in which said bolt-like stop is displaceably guided.

10. The transport apparatus according to claim 1, including guide devices in which said elements are displaceably supported.

11. The transport apparatus according to claim 1, including a factory floor of a spinning mill building in which the transport apparatus is embedded.

12. The transport apparatus according to claim 1, including a factory floor of a spinning mill building to which the transport apparatus is directly secured.

13. A transport system, comprising:
    a plurality of transport apparatuses for feeding textile packages used in the textile industry in two transport directions, each of said transport apparatuses including:
    a first pusher element being displaceable in two transport directions;
    a second pusher or indexing element extending parallel to said first pusher element;
    a coupling device for coupling said elements in various positions with limited mutual movement;
    a reversible drive mechanism being connected to one of said elements for acting on said one element to produce a relative motion between said elements; and
    latch carriers for the two transport directions being movably supported on said first pusher element, said latch carriers being pivotal into a transport plane of sliver holding containers in accordance with the transport directions by said second pusher or indexing element, and said latch carriers being automatically pivoted into one of a transport position and an idle stroke position under influence of said relative motion;
    at least one of said reversible drive mechanisms of said transport apparatuses having a working increment enabling a transition of spinning cans from one to another of said transport apparatuses.

14. The transport system according to claim 13, wherein said latch carriers include a front latch carrier, and said reversible drive mechanism of at least one of said transport apparatuses shifts said front latch carrier beyond a normal stroke into the vicinity of an adjacent transport apparatus.

15. The transport system according to claim 13, wherein said transport apparatuses define a transition region, and including sensor devices monitoring said transition region, and a control unit through which said sensor devices communicate with said drive mechanisms of said transport apparatuses.

16. An automatic can transport vehicle, comprising:
    at least one transport apparatus for feeding textile packages used in the textile industry in two transport directions, each of said transport apparatuses including:
    a first pusher element being displaceable in two transport directions;
    a second pusher or indexing element extending parallel to said first pusher element;
    a coupling device for coupling said elements in various positions with limited mutual movement;
    a reversible drive mechanism being connected to one of said elements for acting on said one element to produce a relative motion between said elements; and
    latch carriers for the two transport directions being movably supported on said first pusher element, said latch carriers being pivotal into a transport plane of sliver holding containers in accordance with the transport directions by said second pusher or indexing element, and said latch carriers being automatically pivoted into one of a transport position and an idle stroke position under influence of said relative motion.

17. The automatic can transport vehicle according to claim 16, wherein said at least one transport apparatus is a plurality of transport apparatuses, and including a plurality of spinning can parking places disposed side by side on the can transport vehicle, each of said spinning can parking places having a bottom region with a separate one of said transport apparatuses to be triggered in a defined manner.

18. The automatic can transport vehicle according to claim 16, wherein said at least one transport apparatus is one transport apparatus, and including spinning can parking places on the can transport vehicle, said can transport apparatus being disposed below said spinning can parking places and being displaceable in a longitudinal axis of the vehicle, said transport apparatus being purposefully positionable relative to said spinning can parking places.

* * * * *